DISCONNECT CIRCUIT FOR REMOTE LINE CONCENTRATOR

Filed Dec. 11, 1962 2 Sheets-Sheet 1

INVENTORS C. E. BROOKS
G. B. CROFUTT, JR.
J. L. HENRY
BY SE Hollander
ATTORNEY

May 17, 1966 C. E. BROOKS ETAL 3,251,948

DISCONNECT CIRCUIT FOR REMOTE LINE CONCENTRATOR

Filed Dec. 11, 1962 2 Sheets-Sheet 2

3,251,948

DISCONNECT CIRCUIT FOR REMOTE LINE CONCENTRATOR

Chester E. Brooks, Montvale, George B. Crofutt, Jr., Verona, and James L. Henry, Madison, N.J., assignors to Bell Telephone Laboratories, Incorporated, New York, N.Y., a corporation of New York Filed Dec. 11, 1962, Ser. No. 243,869
15 Claims. (Cl. 179—18)

This invention relates to telephone line concentrator systems and more particularly to disconnect circuits for line concentrator systems incorporating magnetic latching line units.

Telephone line concentration is premised on the extension of a relatively larger number of lines over a relatively smaller number of trunks to a telephone central office. The connections between the trunks and lines are made at a location or locations which are remote from the telephone central office. The advantages inherent in line concentration are manifest and include the copper savings and other outside plant cost reductions which derive from the lack of necessity to extend each substation over a direct line to the office.

An advanced type of line concentrator system in which the concentrator or remote switching unit is "distributed" in a number of remote locations contiguous to subscriber substations as distinguished from a centralized line concentrator which serves subscribers from a single location is shown in an application of C. E. Brooks and J. L. Henry, Serial No. 79,384, filed December 29, 1960, now Patent No. 3,129,291, of April 14, 1964.

Although completely operative and useful, the concentrator arrangement therein disclosed which was predicated on the utilization of "magnetic latching" switches, i.e., switches which remain in the operated condition without additional power supply or continuous current drain presented certain problems in the disconnection of lines from trunks at the remote units.

Thus, in the above-referred-to application, when it became necessary to disconnect a particular line from the trunk over which it was extended to the central office, specific disconnect potentials were applied to the trunk and to certain control conductors. The combination of voltages on the control conductors and the trunk were utilized to open or release relays which divorced the line from its metallic connection to the trunk and also connected the line to a unique group of control or number group conductors extending to the office. The latter function is vital in the event that the line attempts to establish additional service requests since it will be recalled that no line in a concentrator system has a direct and continuous connection to the office. Instead, the line has access to the office to indicate a service requesting condition over the number group conductors adverted to, which conductors are shared with other lines.

In this requirement of reconnecting the line to the number group conductors upon disconnection from a speech trunk rests a threat to line concentrator operations in general. The hazard involved in any line concentrator disconnect operation is the possibility that the line will, indeed, be disconnected from the trunk over which it was extended to the office but will not simultaneously be reconnected to the control conductors or other shared facilities by which it may have access to the office to indicate a service request. Thus, if the line is disconnected from the trunk and not reconnected to the control conductors which extend directly to the central office, it is rendered in every sense a "dead line" since it cannot receive dial tone or even side tone because it is completely disconnected from any channel to the telephone office.

As indicated in the above-referred-to application, a number of unique aspects of the arrangement therein disclosed included the series connection of the equipment for disconnecting the line from the trunk and reconnecting it to the control conductors which extend to the office. In essence, this was intended to insure that if the line were disconnected from the trunk it must then be reconnected to the control conductors since both equipments were serially interconnected and if one worked then perforce the other must.

While this is a reasonable assumption and leads to fully operative arrangements, the threat nevertheless remains that in view of very exceptional critical or marginally operative conditions and differences in response time between the two serially connected equipments, the trunk-to-line disconnecting equipment might operate although the equipment for restoring the line to the control conductors did not.

The critical or marginal element in this pattern of operations derives from the fact that, as indicated above, the disconnect operation is effected as a result of potentials applied over the trunk. Once the trunk is disconnected from the line, the disconnect potential which appeared over the trunk is no longer available to have restored the line to the control conductors.

It is therefore an object of this invention to provide for the continued application of disconnect current to the line side circuitry at the remote unit after the line has been disconnected from the speech trunk.

A further object of this invention is to prevent a line from being disconnected from a selected trunk to the central office without being reconnected over the control conductors to the office.

These and other objects and features of the invention are achieved in one illustrative embodiment in which a disconnect arrangement is provided at a telephone line concentrator remote switching unit which includes facilities for insuring the disconnection of a particular telephone line from a selected speech trunk and the reconnection and transfer of the same line to the appropriate control coductors or sensory mechanism required for detecting originating calls.

The arrangement includes a circuit for perfecting the disconnection of the line from the trunk in two sequential stages of operation. The first stage of operation involves marking the particular line to be disconnected by applying a potential of a first polarity to the trunk from which the line is to be disconnected and a potential of an opposite polarity to a common disconnect conductor. A gas tube unique to the line to be disconnected is fired and a capacitor is charged over a path including the trunk to be disconnected, the crosspoints between the line and the trunk, the gas tube and a common disconnect conductor.

After allowing a sufficient interval for the capacitor to be fully charged over this path, the potentials on the trunk and common disconnect conductor are abruptly reversed. In consequence thereof, another gas tube unique to the crosspoint to be disconnected is energized and current flows over the trunk, the gas tube, the crosspoint relay winding and the transfer or "cut-off" relay winding to the control conductors. It is essential to observe that the path just traced does not include and, in fact, is in bypass of the crosspoint contacts themselves. This permits the control equipment to continue to deliver disconnect current to the crosspoint relay winding and to the transfer relay winding for an interval determined exclusively by the control equipment at the central office and unaffected by the opening of the crosspoint contacts. This procedure very simply and expeditiously avoids the prior art difficulty which arose in consequence of supplying the disconnect current to the crosspoint relay winding and to the transfer relay winding over the crosspoints themselves and, in consequence, interrupting the disconnect current supply abruptly when the crosspoint contacts opened—presenting a marginal situation.

As will be explained in detail hereinafter, the charging of the capacitor during the first stage of the sequence of operations is, in effect, utilizing the capacitor as a memory store to register the identity of the particular line to be disconnected by actually "marking" the line unit individual to the line to be disconnected. During the second sequence of operations, the reversed potentials on the speech trunk and the common disconnect conductor produce a firing potential which is sufficiently high only at that particular line package which has been marked prior thereto by the charging of the capacitor memory store.

Since the disconnect current can be continued over a path independent of the opening of the crosspoint contacts and, therefore, for an arbitrary time determined only by the control equipment, it is possible to calibrate the time during which the disconnect current is applied to a value sufficient on the basis of empirical data to insure the actuation of the crosspoint contacts and the actuation of the contacts of the transfer mechanism. This accomplishes the desirable end of insuring on a disconnect function that the line is both disconnected from the speech trunk at the crosspoint contacts and reconnected or restored at the contacts of the transfer mechanism to the number group conductors. The over-all procedure thus eliminates dependence upon the opening or closure of the crosspoint contacts in the channel for delivery of disconnect current to the remote switching unit.

The present arrangement is disclosed in combination with a No. 1 crossbar system described in Patents 2,089,921 and 2,235,803, of W. W. Carpenter, of August 10, 1937, and March 18, 1941, respectively.

A feature of this invention includes facilities for energizing disconnect equipment at a remote switching unit to open crosspoint contacts between a particular line and a trunk over a path exclusive of said crosspoint contacts.

Another feature of this invention includes equipment for supplying disconnect current to a remote concentrator switching unit for a time period controlled solely at the central office.

A further feature of this invention includes facilities for performing a disconnect sequence function in two distinct successive sequences, the first of which includes the marking of a particular line to be disconnected and the second of which includes the disconnection of the particular line from a particular trunk.

A further feature of this invention includes facilities for applying disconnect potentials to the trunk to be disconnected and to a common disconnect conductor for a predetermined period of time sufficient to energize a capacitor memory store at the remote switching unit and for thereafter reversing the potentials applied to the trunk and the disconnect conductor to open the crosspoints between the line and the trunk.

These and other objects and features of the invention may be more readily comprehended from an examination of the following description, appended claims and attached drawing in which:

FIG. 1 shows a group of remote line switching units comprising the field or remote portion of the invention; and FIG. 2 which should be placed to the right of FIG. 1 includes the central office portion of the present invention.

*General description of major components*

Referring now to FIGS. 1 and 2 it is seen when FIG. 2 is placed to the right of FIG. 1 that a plurality of number group conductors extend from the office, illustratively eight in number, of which only a portion are shown.

In addition, ten speech trunks TK0–TK9 (of which three are shown) are utilized for extending communication paths from the substation lines which may illustratively be fifty in number although only three are shown in FIG. 1.

A control circuit 123 and trunk termination 47 both of which are shown in outline form only but explained in detail in the above-referred-to application of C. E. Brooks and J. L. Henry are utilized to terminate the control or number group conductors and the speech trunks, respectively.

The central office equipment shown in FIG. 2 in dotted outline form constitutes conventional equipment in a No. 1 crossbar office as explained in detail in the above-referred-to Carpenter patents.

It will be noted that each of the substation packages 120–122 of which only package 120 is shown in detail includes equipment for connecting each of the lines to a particular group of number group conductors and also facilities for connecting each of the lines to each of the speech trunks TK0–TK9. Thus, diodes 142, 143 and 144 are unique to substation 124 and connect that substation to number group conductors NG1–NG3. Moreover, trunk relays T0–T9 of which only three are shown corresponding to trunks TK0–TK9 are available for connecting substation 124 to any one of the ten trunks as required over the contacts of the respective trunk relay T–. In this respect the "crosspoint" contacts between the lines and the trunks are, in effect, the contacts of relays T0–T9.

Each line package includes equipment for detecting and forwarding line service requests to the central office which equipment is in the nature of a line relay or sensory mechanism responsive to line offhook conditions. Relay CS is operated on a line off-hook condition to transmit a signal to the central office as explained in detail herein.

Moreover, each package is also provided with the usual "cutoff" equipment for divorcing the line from its usual connection to the sensory device (in this case relay CS and the number group conductors) and for connecting the line, instead, to a speech path to the central office thereby providing the desired "clean" or metallic connection to the office which is free of bridging impedance. Relay NGS performs this function in line package 120 and the contacts of relay NGS are seen to transfer the tip and ring conductors of the loop from relay CS and the number group conductors to a multiple connection leading to each of the trunk crosspoints.

Since the line packages 120–122 are remote from the central office and would normally require the transmission of power over substantial distances where continued relay operation is necessary, relays NGS and T0–T9 have been designed as magnetic latching relays of the type disclosed in the above-referred-to application of C. E. Brooks and J. L. Henry. In consequence, relays T0 and NGS are adapted to have current supplied to their operating windings in two directions. In the first direction the contacts of relay T0 are released and the break contacts of relay NGS are engaged. In the second direction the contacts of relay T0 are operated and the make contacts of relay NGS are actuated.

Although the equipment for applying marking potentials in the control circuit is shown in outline form only to preserve clarity, suitable control equipment for performing these functions is shown in the above-referred-to application. Similarly with respect to trunk termination 47, the equipment for applying marking potentials is again shown symbolically since the revelation of the detailed equipment is not essential to an understanding of the present invention. For a comprehensive disclosure of suitable equipment for applying the marking potentials in trunk termination 47, reference may be made to the above-referred-to application.

*General description of operation*

In describing the operation it will be assumed that a party at substation 124 is seeking to effect a connection through the central office to a distant subscriber.

When substation 124 goes off hook, current flows through number group leads NG1–NG3 over a path explained in detail herein and is detected at the central office in the applique circuit 123.

It is seen that package 120 includes equipment for generating a single high intensity identifying pulse on number group leads NG1–NG3 over the contacts of relay CS, also as explained herein.

In conjunction with the identification of the calling line, line relay 2L unique to substation 124 is operated in the manner explained in the above-referred-to application of C. E. Brooks and J. L. Henry. In response to the operation of the line relay, the line group controller 130 and the sender link controller 131 are energized. These circuits select district junctor 133, sender link 134, and sender 135 and operate the necessary select and hold magnets to establish the connections as disclosed in Patent 2,235,803, referred to above.

After the operation of line relay 2L, arrangements are undertaken in the circuit 123 to effect a connection to the substation by applying a marking potential to the number group conductors NG1–NG3 unique to the substation and simultaneously applying a marking potential to the tip conductor of the selected trunk. If trunk TK0 is the selected trunk, a path from substation 124 over trunk TK0 to the central office will be established. Thereafter the circuit may be traced to the subscriber sender 135 which latter transmits dial tone to the calling substation and records the digits dialed at substation 124.

The subscriber sender 135 has access to an originating marker 136 over an originating marker connector 137.

Subsequently, the marker conventionally determines from the called office code the location of the corresponding trunk group on the output of the office link frame 138 and selects an idle trunk 125 in the proper group. Thereafter the marker establishes a path through the district link frame and the office link frame for connecting the district junctor 133 to the selected outgoing trunk 125. The sender 135 then transmits the called line number to the terminating office and the connection is extended to the calling party. This completes the connection on an originating call.

To graphically indicate the distinction between the manner in which a direct-connected or conventional substation would have been connected to the line link frame, substation 128 is shown in dotted outline.

*General description of disconnect operation*

When the conversation has been completed and the subscriber at substation 124 replaces his receiver, a release cycle is initiated. Supervisory equipment in the No. 1 crossbar office senses a decerease in current flow in the trunk circuit and initiates the release cycle in the concentrator. The disconnect or release cycle proceeds in two distinct time sequences. Initially, specific disconnect potentials explained herein are applied to the speech trunk to be disconnected and to the common disconnect conductor CD. A path may then be traced over the crosspoints which connect the line to be disconnected to the trunk to charge a capacitor unique to the line to be disconnected. In effect, this "marks" the particular line to be disconnected and completes the first sequence of the disconnect operation. Subsequently, the potentials on the common disconnect conductor and the trunk conductors are reversed and a path may be traced for the operation of relays T0 and NGS which path is in bypass of the crosspoints of trunk relay T0. Continued current may be delivered to relays NGS and T0 over this path even though the (crosspoint) contacts of realy T0 open and for a duration determined solely at the central office. Since this duration may be adjusted to insure the appropriate actuation of relays T0 and NGS, it is possible to provide for the certain release of the contacts of relay T0 thereby disconnecting the line from the speech trunk and the actuation of relay NGS thereby restoring the line to the number group conductors.

*Detailed description*

When substation 124 goes off hook to initiate a service request, the switchhook contacts (not shown) in the receiver are closed and a path is completed over the loop from negative battery 216 in the central office, switches 210–212, number group conductors NG1, NG2 and NG3 to diodes 142–144, respectively, in the line package 120. The circuit is further extended over diode D9, winding of relay CS, contacts of relay NGS, tip conductor of the loop, substation 124, ring conductor of the loop, contacts of relay NGS, diode D10 to ground over conductor NGR. This path, when completed, results in the operation of call start relay CS.

When the contacts of relay CS are closed, a pulse of current is delivered through capacitor 145 in view of the sudden low impedance path through diode D10, contacts of relay CS, capacitor 145 and diode D9 to diodes 142–144. This current pulse is extended over conductors NG1–NG3 to detecting circuits at the applique circuit in the central office which are not shown in order to preserve clarity but are shown in detail in the above-referred-to application of C. E. Brooks and J. L. Henry.

Figure 1:
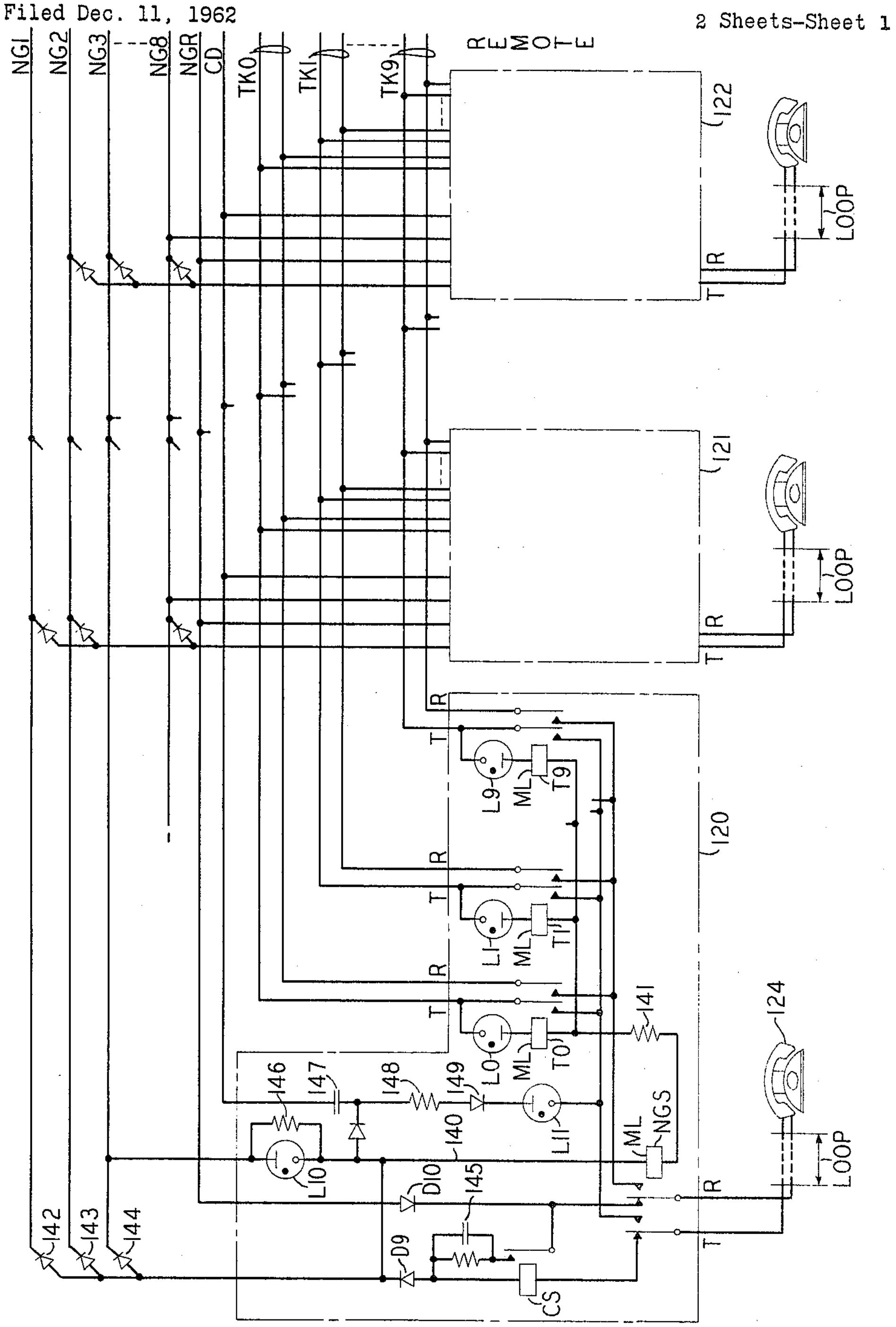
Figure 2:
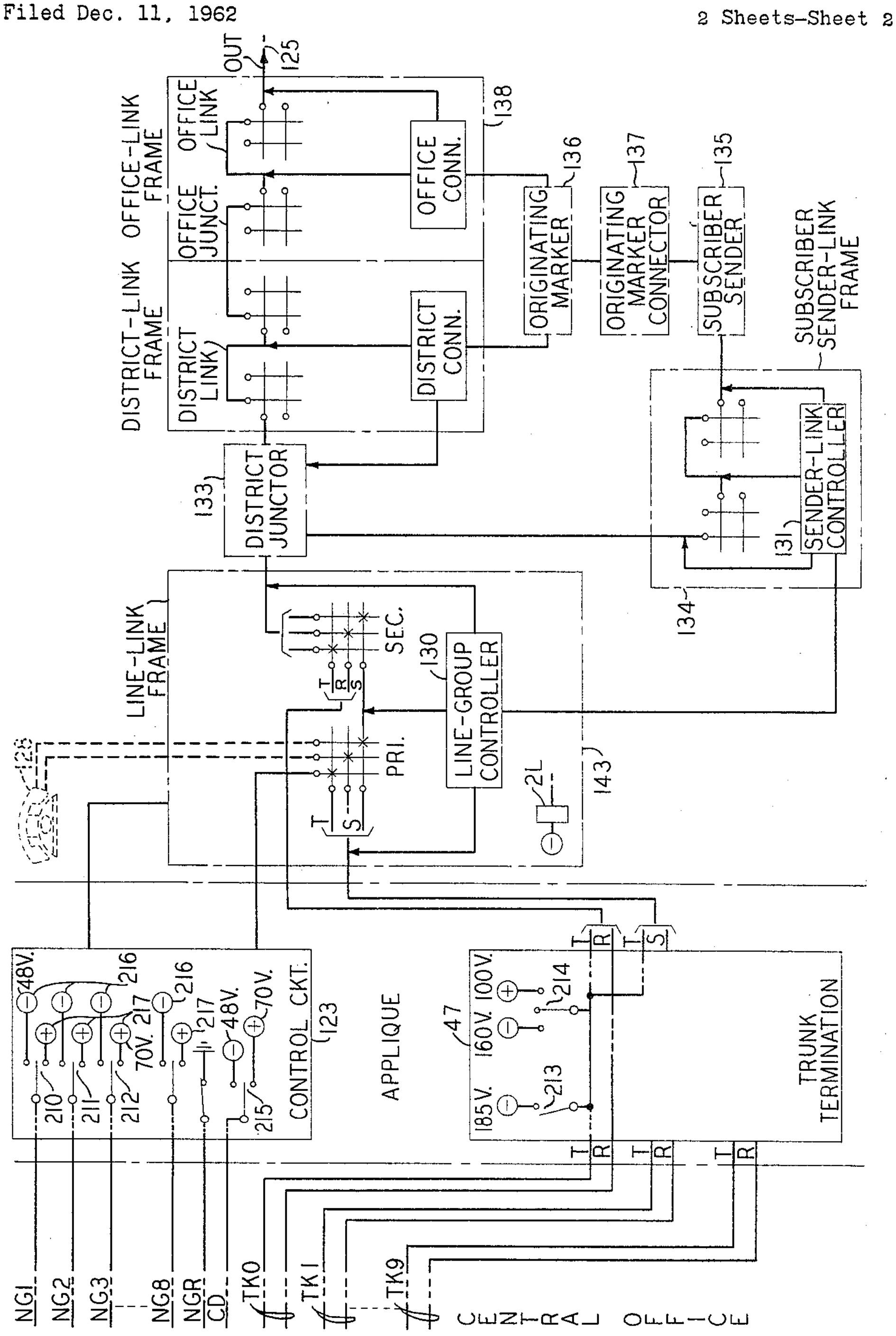

The number group detector relays unique to number group conductors NG1–NG3 are operated to record the identification of the calling substation at the central office. Operation of the number group detector relays ultimately result in the operation of a line relay unique to the calling subscriber's line which is shown symbolically in FIG. 2 as relay 2L.

In response to the operation of line relay 2L, the No. 1 crossbar system is operated in a routine manner. Thus, the line group controller 130 and the sender link controller 131 are energized to select an idle district junctor 133, sender link 134 and sender 135.

When the line link primary select magnet (not shown) has operated in the conventional manner, as disclosed in the above-referred-to Carpenter patent, marking equipment is operated to apply marking potentials to the number group conductors and to the tip conductor of the selecetd trunk. Thus, by the appropriate operation of switches 210–212, the number group conductors NG1–NG3 may be selectively connected to a +70 volt potential 217. The manner of this connection is shown symbolically in FIG. 2 for simplicity. For a detailed explanation of the manner in which the markings potentials are connected by the marking relays, reference may be made to the above-referred-to application.

Concurrently, with the application of the +70 volt potential to the number group conductors NG1–NG3 unique to the calling substation line, a −185 volt potential is applied to the tip conductor of the selected trunk which is illustratively trunk TK0 as shown symbolically by the operation of switch 213. The negative 185 volt potential applied to the tip conductor of trunk TK0 extends to the cathode of gas tube L0. The potential on the anode may be traced from the winding of relay T0, resistance 141, winding of relay NGS, conductor 140, resistance 146, number group conductor NG3 to the positive 70 volt potential source over switch 212. This results in the production of a potential of 255 volts across the gas tube L0. Gas tube L0 fires in consequence of the potential thereacross and the sustain voltage of the tube which may illustratively be 70 volts results in the application of a potential of approximately 185 volts across the electrodes of tube L10 which latter also fires and provides a path for the operation of relays T0 and NGS in series.

As current develops in the windings of relay T0 and NGS, the contacts of relay T0 which were previously open are closed and latched in the closed condition, and the contacts of relay NGS transfer the loop conductors T and R from the number group conductors NG1–NG3 and NGR to the tip and ring conductor of the selected trunk TK0 over the contacts of relay T0. At this time substation 124 is connected to the central office over the trunk TK0, thus completing the connection to the calling substation. As indicated in the general description, the subscriber will ultimately be connected to a subscriber sender 135 and routine control operations will be initiated in the No. 1 office to effect a connection to the called party whose directory number is dialed into the subscriber sender 135.

*Detailed description of disconnect operation*

It will now be assumed that the conversation is terminated and the subscriber at substation 124 hangs up. Conventional supervisory equipment in the No. 1 crossbar office is sensitive to the decrease in direct current in the trunk circuit and initiates apparatus which releases the connection by removing the ground condition from the sleeve conductor in the primary and secondary crossbar switches of the line link frame.

Specifically, certain disconnect potentials are applied to the trunk to be disconnected and to the common disconnect conductor in a manner explained in detail in the above-referred-to application. For purposes of clarity, the manner of application of the disconnect potentials is shown symbolically by the operation of switch 214 and switch 215.

Thus, initially, during the first stage of disconnection, a disconnect potential of −160 volts is applied to the tip conductor of trunk TK0 at switch 214 and a disconnect potential of +70 volts is applied to the common disconnect lead CD at switch 215. The −160 volt potential on the tip conductor of trunk TK0 is extended through the crosspoint contacts of relay T0 to appear at the cathode of the disconnect tube L11. Condenser 147 was discharged prior to the initiation of the disconnect operation and, in consequence, a voltage of +70 volts appears on the anode of tube L11 via resistance 148 and diode 149. Tube L11 therefore experiences a voltage of 230 volts and breaks down. Current flows to charge capacitor 147 and after a sufficient time to complete charging (illustratively approximately 5 milliseconds) the second stage of disconnection is initiated when the voltage on the tip conductor of the trunk is shifted to +100 volts at switch 214 and at the same time the voltage on the common disconnect lead is shifted back to −48 volts.

Assuming that the sustain voltage of tube L11 is 70 volts, the charge on capacitor C1 would be approximately 160 volts. In view of the change in potential on the common disconnect lead from +70 to −48, the voltage at the top of relay NGS (conductor 140) will be approximately −208 volts (−160 on the capacitor and −48 on the common disconnect lead CD). This voltage will appear on the anodes of all ten trunk tubes L0–L9. However, idle or busy trunks will have zero or slightly negative voltages on the tubes thereof. The trunk to be disconnected has +100 volts thereon. As a result, when the applied voltage equals or exceeds the breakdown voltage of the trunk tube L0, the tube fires before the others and current flows to discharge capacitor 147. After capacitor 147 completes its discharge, a path may be traced from the tip conductor of trunk TK0, tube L0, winding of relay T0, resistance 141, winding of relay NGS, conductor 140 and diodes 142–144 in parallel over number group conductors NG1–NG3 to negative battery to sustain the current flow through trunk tube L0 and relays T0 and NGS in series. This sustain current flow is in a direction which is opposite to that traced above for the closure of the contacts of relay T0 and as a result releases the contacts. At the same time the contacts of relay NGS are returned from the tip and ring conductor of trunk TK0 to the number group conductors. The current path through tube L0 is maintained under control of switch 214 in the central office as long as that switch remains closed. After a sufficiently long interval to insure that both relays T0 and NGS have been released, switch 214 is released and substation 124 is disconnected from the trunk and reconnected to the number group circuit in readiness for the next call.

It will be noted that the charging of capacitor 147, during the first stage of disconnection described above, in effect, "marks" the line package including a line to be released. In all other line packages, such as packages 121 and 122, the application of the positive disconnect potential 100 volts to the tip conductor is met by the usual −48 volts on the common disconnect conductor CD and the resultant voltage is insufficient to cause a breakdown of any of the trunk tubes thereat.

It is to be understood that the above-described arrangements are illustrative of the application of the principles of the invention. Numerous other arrangements may be devised by those skilled in the art without departing from the spirit and scope of the invention.

What is claimed is:

1. A remote telephone line concentrator system for connecting a plurality of substations over a smaller plurality of trunks to a telephone central office comprising remote switching means for connecting said substations to said trunks, first means at said remote switching means for connecting said substations to said trunks under control of said office, call start means at said remote switching means responsive to service request indications at said substations for delivering supervisory information to said central office, second means at said remote switching means for disconnecting said line from said call start means, means at said remote switching means responsive to a service request indication on one of said substations for energizing said first and second means simultaneously, and additional means in said remote switching means responsive to a disconnect indication on one of said lines for energizing said first and second means in an opposite direction over a path independent of said first means.

2. A telephone line concentrator system for connecting a plurality of substations over a lesser plurality of trunks to a telephone central office comprising remote switching means including crosspoints for connecting said lines to said trunks under control of said office, a plurality of control conductors coupling said remote switching means to said office, and means in said remote switching means for disconnecting one of said lines from one of said trunks and for connecting said line to said control conductors over a path including said control conductors and said one trunk and exclusive of said crosspoints.

3. A remote telephone line concentrator system for connecting a plurality of substations over a lesser plurality of trunks to a telephone central office comprising remote switching means, said remote switching means including first means comprising crosspoints for connecting said lines to said trunks under control of said office, a plurality of control conductors for coupling said remote switching means to said office, said remote switching means including in addition second means for connecting said lines to said control conductors, and disconnect means operative responsive to a disconnect indication on one of said lines for energizing said first means to disconnect said line from one of said trunks and for energizing said second means to connect said line to said number group conductors, said disconnect means being operative over a path including said control conductors and said one trunk and exclusive of said crosspoints.

4. A telephone line concentrator system including a telephone central office, a plurality of trunks extending from said office, a larger plurality of remote substations, a plurality of remote switching units individual to said substations and physically disposed proximate to said substations, a plurality of control conductors coupling said units to said office, said units including crosspoint means for connecting said substations to said trunks under control of said office, call start means in said units responsive to a service request indication at said substations for applying a distinctive group of pulses represetative of the identity of said calling station to said control conductors, cutoff means jointly operative with said crosspoint means under control of said office for disconnecting said substation from said control cnductors, and additional means responsive to a disconnect indication at one of said substations for energizing said cutoff means and said crosspoint means for disconnecting said particular substation from said trunk and reconnecting said substation to said control conductors over a path exculsive of said crosspoint means.

5. A remote telephone line concentrator system for connecting a plurality of substations over a smaller plurality of trunks to a telephone central office including a plurality of remote switching units individual to said substations and disposed in a multiplicity of physically distinct locations proximate to said substations, said units including crosspoint means for connecting said substation to said trunks under control of said office, cutoff means for disconnecting said substations from said control conductors in response to an originating call, means at said remote switching means responsive to a disconnect indication on one of said substations for marking the remote switching unit individual to said substation over a path including said trunk to be disconnected and a common one of said control conductors, and additional means responsive to the marking of said remote switching unit for thereafter energizing said crosspoint means and cutoff means to disconnect said line from said trunk and to reconnect said line to said control conductors over a path including said trunk and said control conductors and exclusive of said crosspoints.

6. A telephone line concentrator system for connecting a plurality of remote substations over a smaller plurality of trunks to a telephone central office including a plurality of remote switching units individual to said substations and disposed proximate to said substations, said units including crosspoint means and cutoff means for connecting said substations to said trunks and disconnecting said substations from said control conductors in response to an originating call at one of said substations, gas tube means at said remote switching units connected to said crosspoint means, means responsive to a disconnect indication at one of said substations for energizing said gas tube means over a path including a common one of said control conductors and said trunk, and additional means for thereafter energizing said crosspoint means and cutoff means over a path including said trunk and control conductors and exclusive of said crosspoint means.

7. A remote line concentrator system for connecting a plurality of substations over a smaller plurality of trunks to a telephone central office including a plurality of remote switching units individual to said substations and disposed in a plurality of distinct locations proximate to said substations, said units including crosspoints, crosspoint operating means and cutoff means for connecting said lines to said trunks and disconnecting said lines from said control conductors respectively in response to an originating call, marking means at said switching units including a capacitor and gas tube, means responsive to a disconnect indication at one of said substations for firing said gas tube over a common one of said control conductors and said trunk to be disconnected to charge said capacitor, and means for thereafter energizing said crosspoint operating means and cutoff means in response to the discharge of said capacitor and for sustaining the energization of said cutoff means and crosspoint operating means over a path including said control conductors and said trunk to be disconnected and exclusive of said crosspoints.

8. A telephone line concentrator system for connecting a plurality of substations over a smaller plurality of trunks to a telephone central office including a plurality of remote switching units individual to said substations and disposed in a plurality of physically distinct locations proximate to said substations, crosspoint actuating means including a plurality of crosspoint contacts for connecting said lines to said trunks under control of said office, cutoff means for disconnecting said lines from said control conductors, latching means for maintaining said cutoff means and crosspoint means in the operated condition, means responsive to a disconnect indication at one of said substations for disconnecting said substation from a particular one of said trunks including means responsive to the application of potentials over a common one of said conductors and said particular trunk to mark the switching unit individual to said substation, and additional means thereafter responsive to the application of different potentials over a path including said trunk and exclusive of said crosspoint contacts for energizing said crosspoint actuating means and cutoff means to restore said line to said control conductors and to disconnect said line from said particular trunk.

9. A telephone line concentrator system including a telephone central office, a plurality of trunks extending from said office, a larger plurality of remote lines, remote switching means including crosspoints for connecting said lines to said trunks under control of said office, a plurality of control conductors coupling said remote switching means to said office, means in said remote switching means for disconnecting one of said lines from one of said trunks including means responsive to the application of a first group of potentials over said particular trunk and crosspoints for marking said line to be disconnected, and further means responsive to the application of a different group of potentials over said trunk and a common one of said control conductors and exclusive of said crosspoints for disconnecting said line from said trunk.

10. A telephone line concentrator system including a telephone central office, a plurality of speech trunks extending from said office, a larger plurality of remote lines, remote switching means including crosspoint actuating means and crosspoints for connecting said lines to said trunks under control of said office, a plurality of number group conductors for coupling said remote switching means to said office, marking means at said remote switching means including a capacitor and first gas tube, sustaining means including a second gas tube connected in series with said crosspoint means, means responsive to a disconnect indication on one of said lines for disconnecting said line from one of said trunks including means for initially energizing said marking means over a path including said one trunk and a corresponding crosspoint and one of said control conductors to fire said first tube and charge said capacitor, and additional means for subsequently energizing said second gas tube over a path including said particular trunk and said control conductors and exclusive of said crosspoint for operating and sustaining the operation of said crosspoint means.

11. A telephone line concentrator system including a telephone central office, a plurality of speech trunks extending from said office, a larger plurality of remote lines, remote switching means including crosspoints for connecting said lines to said trunks under control of said office, a plurality of control conductors coupling said remote switching means to said office, and means in said remote switching means for disconnecting one of said lines from one of said trunks including means responsive to the application of disconnect potentials to said trunk to be disconnected and to said control conductors for delivering current to said disconnecting means for a time period substantially equal to the time during which said disconnect potentials are applied.

12. A telephone line concentrator system including a telephone central office, a plurality of trunks extending from said office, a larger plurality of remote lines, remote switching means including crosspoints for connecting said lines to said trunks under control of said office, a plurality of control conductors coupling said remote switching means to said office, disconnect means in said remote switching means for disconnecting said line from one of said trunks and for reconnecting said line to said control conductors, means responsive to the termination of a conversation connection over one of said lines for energizing said disconnect means at said remote switching means including means for applying disconnect potentials to said trunk to be disconnected and to said control conductors, and additional means in said remote switching means for delivering current through said disconnect means for disconnecting said line from said trunk and for reconnecting said line to said control conductors for a time period corresponding to the time during which said disconnect potentials are applied.

13. A telephone line concentrator system for connecting a plurality of substations over a smaller plurality of trunks and control conductors to a telephone central office including a plurality of remote switching units individual to said substations and disposed in a plurality of physically distinct locations proximate to said substations, crosspoint operating means for connecting said lines to said trunks under control of said office, cutoff means for disconnecting said lines from said control conductors, gas tube means coupled to said trunks and to said control conductors to form a serial path with said crosspoint operating means and said cutoff means, and means responsive to a disconnect indication at one of said substations for disconnecting said substation from a particular one of said trunks including means responsive to the application of potentials over said control conductors and said particular trunk for delivering disconnect current through said serial path to restore said line to said control conductors and to disconnect said line from said particular trunk including means for delivering said disconnect current over said serial path for a time period equal to the time said disconnect potentials are applied.

14. A telephone line concentrator system for connecting a plurality of remote substations over a smaller plurality of trunks to a telephone central office including a plurality of remote switching units individual to said substations, said units including crosspoint contacts and crosspoint actuating means and cutoff means for connecting said substations to said trunks and disconnecting said substations from said control conductors respectively, and disconnecting means at said central office responsive to a disconnect indication at one of said substations for applying disconnect potentials of a first polarity to said trunk to be disconnected and of an opposite polarity to said control conductors including means for subsequently applying disconnect potentials of said opposite polarity to said trunk to be disconnected and of said first polarity to said control conductors to actuate said crosspoint actuating means and cutoff means over a path including said trunk to be disconnected and said control conductors and exclusive of said crosspoint contacts.

15. A remote line concentrator system for connecting a plurality of substations over a smaller plurality of trunks to a telephone central office including a plurality of remote switching units individual to said substations and disposed in a plurality of distinct locations proximate to said substations, said units including crosspoint actuating means and cutoff means for connecting said lines to said trunks and disconnecting said lines from said control conductors respectively, means at said central office responsive to a disconnect indication at one of said substations for energizing said crosspoint actuating means and said cutoff means over a path including a common one of said control conductors and said trunk to be disconnected, and additional means for thereafter energizing said crosspoint means and cutoff means over a path including said speech trunk to be disconnected and a control conductor unique to said line to be disconnected.

No references cited.

ROBERT H. ROSE, *Primary Examiner.*

WILLIAM C. COOPER, *Examiner.*